(12) United States Patent
Patronas et al.

(10) Patent No.: US 12,706,862 B2
(45) Date of Patent: Aug. 11, 2026

(54) SYSTEMS AND METHODS FOR IMPROVED NETWORK RESILIENCE

(71) Applicant: Mellanox Technologies, Ltd., Yokneam (IL)

(72) Inventors: Ioannis (Giannis) Patronas, Pireas (GR); Paraskevas Bakopoulos, Argiroupoli (GR); Dimitrios Syrivelis, Volos (GR); Nikolaos Argyris, Zografou (GR); Elad Mentovich, Tel Aviv (IL); Louis Bennie Capps, Jr., Georgetown, TX (US); Prethvi Ramesh Kashinkunti, Chicago, IL (US); Julie Irene Marcelle Bernauer, Palo Alto, CA (US); Eitan Zahavi, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 621 days.

(21) Appl. No.: 17/982,895

(22) Filed: Nov. 8, 2022

(65) Prior Publication Data

US 2024/0098040 A1 Mar. 21, 2024

(30) Foreign Application Priority Data

Sep. 20, 2022 (GR) .............................. 20220100769

(51) Int. Cl.
*H04L 49/55* (2022.01)
*H04L 49/00* (2022.01)

(52) U.S. Cl.
CPC ............ *H04L 49/557* (2013.01); *H04L 49/30* (2013.01); *H04L 49/555* (2013.01)

(58) Field of Classification Search
CPC ...... H04L 49/557; H04L 49/30; H04L 49/555
See application file for complete search history.

(56) References Cited

U.S. PATENT DOCUMENTS 6,567,576 B2 5/2003 MacDonald
6,836,353 B1 12/2004 Ramadas et al.
(Continued)

FOREIGN PATENT DOCUMENTS

EP 1009192 A2 6/2000
WO WO-2017077093 A2 * 5/2017 ......... H04Q 11/0005

OTHER PUBLICATIONS

"Credo Announces HiWire SWITCH AEC-Enabling Simpler Faster and More Reliable Dual TOR Connectivity", [online] Jul. 15, 2021. Retrieved from the internet <https://financialpost.com/pmn/press-releases-pmn/business-wire-news-releases-pmn/credo-announces-hiwire-switch-aec-enabling-simpler-faster-and-more-reliable-dual-tor-connectivity>.

(Continued)

*Primary Examiner* — Mounir Moutaouakil
(74) *Attorney, Agent, or Firm* — ALSTON & BIRD LLP

(57) ABSTRACT

Systems, apparatuses, and methods are provided for resilience in network communications. An example system includes at least one first network port including a first plurality of subports and at least one second network port including a second plurality of subports. The system also includes an intermediate switch communicably connected to the at least one first network port and the at least one second network port. At least one of the first plurality of subports includes at least one first offline subport that is inoperable in an instance in which each of the remaining first plurality of subports are operable. The intermediate switch is configured to route communication from one of the second plurality of subports to the at least one first offline subport in an instance in which the intermediate switch receives an indication of a malfunction associated with the first plurality of subports.

20 Claims, 4 Drawing Sheets

(56) References Cited

U.S. PATENT DOCUMENTS 6,981,174 B1 12/2005 Hanning
7,099,578 B1 8/2006 Gerstel
7,359,635 B2 4/2008 Helbing et al.
9,491,526 B1 11/2016 Zhao et al.
9,692,511 B1 6/2017 Webman et al.
10,229,017 B1 * 3/2019 Zou .................... G06F 11/2007
10,694,268 B2 6/2020 Menard et al.
10,834,484 B2 11/2020 Frankel et al.
11,245,970 B1 * 2/2022 Jia ...................... H04Q 11/0005
11,374,673 B2 6/2022 Hu et al.
11,451,889 B2 9/2022 Willcock
2004/0078419 A1 4/2004 Ferrari et al.
2004/0085893 A1 5/2004 Wang et al.
2004/0133634 A1 7/2004 Luke et al.
2005/0232629 A1 10/2005 Amemiya et al.
2008/0130489 A1 * 6/2008 Chao ....................... H04L 45/22 370/219
2008/0130491 A1 * 6/2008 Chao ....................... H04L 45/00 370/225
2008/0285437 A1 11/2008 Polland
2009/0257751 A1 * 10/2009 Sadananda .......... H04J 14/0294 398/83
2013/0243416 A1 9/2013 Dahlfort et al.
2014/0071812 A1 * 3/2014 Pao ....................... H04L 12/437 370/223
2015/0098700 A1 4/2015 Zhu et al.
2015/0304238 A1 10/2015 Brown
2016/0007102 A1 1/2016 Raza et al.
2016/0110270 A1 4/2016 Iwashita
2019/0034305 A1 * 1/2019 Perumal .................. H04L 69/40
2019/0052567 A1 2/2019 Muntz
2019/0114877 A1 4/2019 Hohman
2021/0194724 A1 * 6/2021 Lee .................... H04J 14/0283
2021/0377160 A1 * 12/2021 K ............................ H04L 45/64
2022/0173980 A1 6/2022 Yoon
2022/0209988 A1 6/2022 Hatano et al.

OTHER PUBLICATIONS

Mellette, W. et al., "P-FatTree: A Multi-channel Datacenter Network Topology", [online] HotNets '16: Proceedings of the 15th ACM Workshop on Hot Topics in Networks, Nov. 2016, pp. 78-84. Retrieved from the internet <https://doi.org/10.1145/3005745.3005746>.

Michelogiannakis, G. et al., "Bandwidth Steering in HPC Using Silicon Nanophotonics", [online] In Proceedings of the International Conference for High Performance Computing, Networking, Storage and Analysis, Nov. 17-22, 2019, Denver, CO., pp. 1-25. Retrieved from the internet <https://doi.org/10.1145/3295500.3356145>.

Minkenberg, C. et al., "Large-Scale System Partitioning using OCS," [online] 2015 International Conference on Photonics in Switching (PS), Florence, Italy, 2015, pp. 235-237. Retrieved from the internet <doi: 10.1109/PS.2015.7329011>.

Patronas, et al., pending U.S. Appl. No. 17/956,035, filed Sep. 29, 2022.

Patronas, et al., pending U.S. Appl. No. 17/956,208, filed Sep. 29, 2022.

Patronas, et al., pending U.S. Appl. No. 17/964,367, filed Oct. 12, 2022.

Patronas, et al., pending U.S. Appl. No. 17/982,827, filed Nov. 8, 2022.

Patronas, et al., pending U.S. Appl. No. 18/083,981, filed Dec. 19, 2022.

Yojiro Mori and Ken-Ichi Sato. "High-port-count optical circuit switches for intra-datacenter networks", Journal of Optical Communications and Networking, vol. 13, No. 8, Aug. 2021, 10 pages. (Year: 2021).

* cited by examiner

SYSTEMS AND METHODS FOR IMPROVED NETWORK RESILIENCE

CROSS-REFERENCE TO RELATED APPLICATIONS

This application claims priority to Greek Patent Application No. 20220100769, filed Sep. 20, 2022, the entire contents of which application are hereby incorporated herein by reference.

TECHNOLOGICAL FIELD

Example embodiments of the present disclosure relate generally to network resilience and, more particularly, to improving resilience in network communications.

BACKGROUND

Datacenters and other networking environments (e.g., datacom, telecom, and/or other similar data/communication transmission networks) may include connections between switch systems, servers, racks, network ports, subports, and other devices in order to provide for signal transmission between one or more of these elements. Network ports may include any device (e.g., switches, hosts, servers, and/or the like) by which data may be transferred, and these network ports strive to maintain consistent operability to avoid network outages. Applicant has identified a number of deficiencies and problems associated with network systems and associated communications. Through applied effort, ingenuity, and innovation, many of these identified problems have been solved by developing solutions that are included in embodiments of the present disclosure, many examples of which are described in detail herein.

BRIEF SUMMARY

Systems, apparatuses, and methods are provided for resilience in network communications. An example system for network resilience may include at least one first network port including a first plurality of subports, at least one second network port including a second plurality of subports, and an intermediate switch communicably connected to the at least one first network port and the at least one second network port. At least one of the first plurality of subports may include at least one first offline subport, wherein the at least one first offline subport is inoperable in an instance in which each of the remaining first plurality of subports are operable. The intermediate switch may be configured to route communication from one of the second plurality of subports to the at least one first offline subport in an instance in which the intermediate switch receives an indication of a malfunction associated with the first plurality of subports.

In some embodiments, in response to the indication of the malfunction associated with the first plurality of subports, the intermediate switch may be configured to terminate communication to at least one of the first plurality of subports associated with the indication of the malfunction.

In some embodiments, in response to an indication that the malfunction associated with the first plurality of subports has been resolved, the intermediate switch may be further configured to reestablish communication between the second plurality of subports and the first plurality of subports other than the first offline subport.

In some embodiments, at least one of the second plurality of subports comprises at least one second offline subport that is inoperable in an instance in which each of the second plurality of subports are operable.

In some further embodiments, the intermediate switch may be configured to route communication from one of the first plurality of subports to the at least one second offline subport in an instance in which the intermediate switch receives an indication of a malfunction associated with the second plurality of subports.

In any embodiment, the at least one first network port and the at least one second network port may be electrical network ports and/or the intermediate switch may be an optical switch.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Overview

Figure 1:
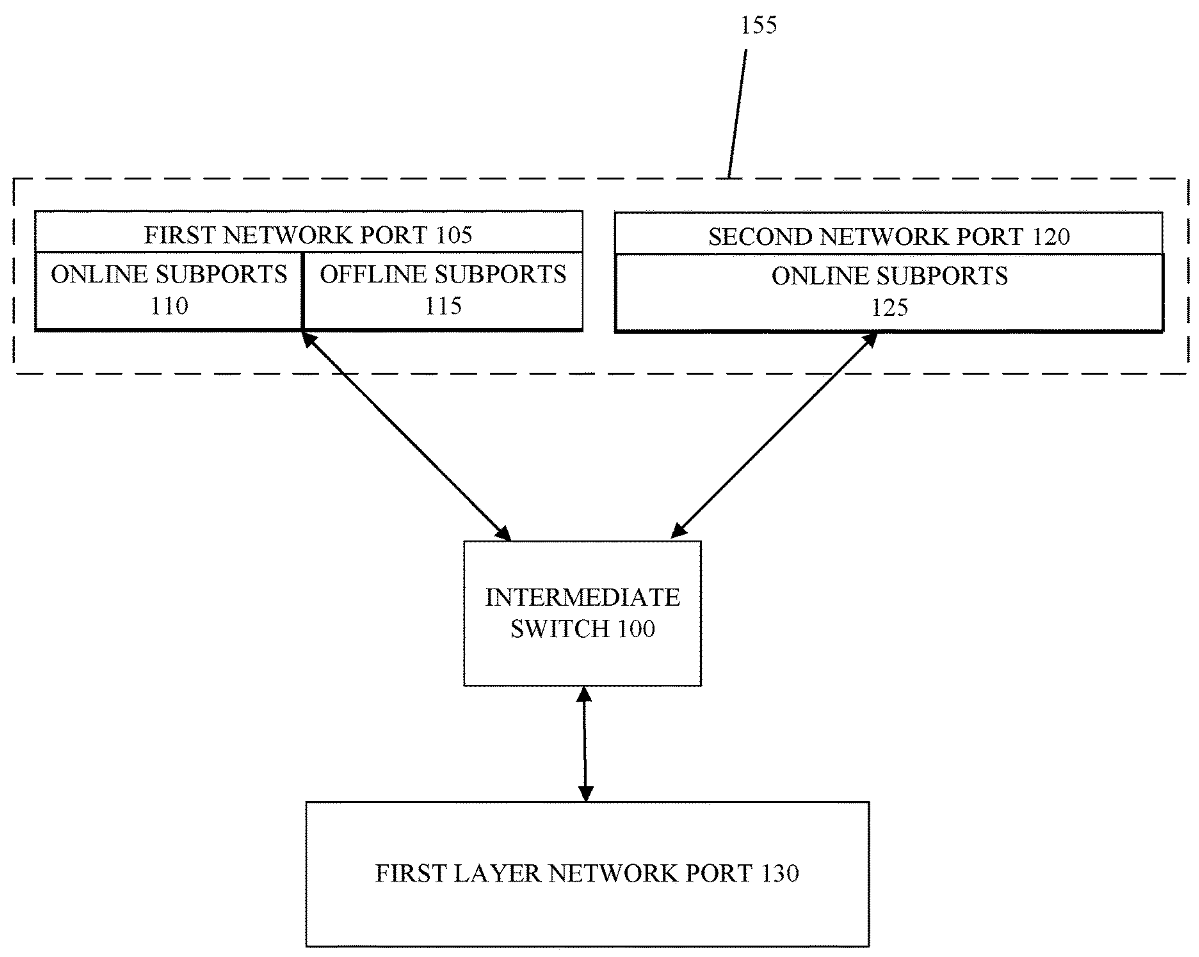
FIG. 1 illustrates an example system for network resilience in accordance with various embodiments.

As described above, modern communication networks may include a large number of interconnected network devices referred to herein as network ports (e.g., switches, servers, hosts, etc.). These network ports may each define a plurality of subports with which the network ports form connections with other devices in the network (e.g., the subports of other network ports). These communication networks and systems often rely on network ports and subports that are consistently operational to prevent, avoid, or substantially reduce the occurrences of network outages. Due to unintended malfunction, scheduled or unscheduled maintenance, varying environmental conditions, and/or the like, network ports and subports may inevitably be inoperable. Conventional network resilience and failure recovery techniques leverage rigid algorithmic methods, such as modifying communication routing rules when a network port or subport fails. These current resilience and failure recovery methods, however, are burdensome, inefficient, and reduce network performance. In other words, conventional systems and methods fail to provide network resilience solutions that dynamically address network port and subport malfunctions without negatively impacting network performance.

In order to solve these issues and others, embodiments of the present disclosure provide for network resilience by providing offline or otherwise redundant subports within a network port that may receive communications in an instance in which the remaining (e.g., primary communication subports) are inoperable. For example, a first network port may include a plurality of subports that includes a first offline subport. Prior to any malfunction, the plurality of subports of the first network port may be communicably coupled with corresponding subports of a second network port via an intermediate switch. In an instance in which the intermediate switch receives an indication that at least one of the subports of the first network port is inoperable (e.g., malfunctioning, undergoing maintenance, or otherwise offline), the intermediate switch may route communication from one of the second plurality of subports to the at least one first redundant/offline subport. In other words, the embodiments described herein may implement, leverage, or otherwise access subports that intentionally remain offline or inoperable prior to required resilience operations (e.g., the purpose of the redundant/offline network ports may be limited to providing resilience operations). In this way, the resilience embodiments of the present disclosure may eliminate or substantially reduce the impact of network port or subport malfunction with minimal additional hardware. Furthermore, in some embodiments, multiple network ports may each include redundant or offline subports so as to, in response to a malfunction, redistribute network communications amongst a plurality of interconnected network ports.

As described herein, network ports and the subports leveraged by these network ports may be referred to with reference to "input" and "output" as related to the communication direction for these devices. The terms "input" and "output," however, are used merely for illustrative purposes in that the data, signals, information, etc. that is transmitted by the network ports and subports described herein may travel in either direction. In other words, an example subport that operates as an input may also operate as an output, and an example subport that operates as an output may similarly operate as an input. The present disclosure, therefore, contemplates that the network ports and subports described herein may operate to transmit data, signals, and information to and receive data, signals, and information from any device communicably coupled thereto regardless of reference to input, output, network layer, etc.

Furthermore, as would be evident to one of ordinary skill in the art in light of the present disclosure, the terms "substantially" and "approximately" indicate that the referenced element or associated description is accurate to within applicable engineering tolerances.

Embodiments of the present disclosure now will be described more fully hereinafter with reference to the accompanying drawings in which some but not all embodiments are shown. Indeed, the present disclosure may be embodied in many different forms and should not be construed as limited to the embodiments set forth herein; rather, these embodiments are provided so that this disclosure will satisfy applicable legal requirements. Like numbers refer to like elements throughout.

Example Network Configuration

With reference to FIG. 1, an example system for resilience in network communications 101 is illustrated. As shown, the system 101 may include various network layers, such as a first layer network ports 150 and second layer network ports 155 operably or otherwise communicably coupled via an intermediate switch 100. The second layer network ports 155 may include a first network port 105 including a first plurality of subports 110, 115 and a second network port 120 including a second plurality of subports 125. The first network port 105 and the second network port 120 may be communicably coupled in the system 101 such that data, signals, information, and/or the like may be transmitted therebetween. Each of the network ports (e.g., the first network port 105 and the second network port 120) of the system 101 may include any networking component or device, such as a switch, a server, a network interface controller (NIC), a networking card, a host, and/or the like. Said differently, the present disclosure contemplates that any network port described herein may refer to any networking device by, with, and/or through which data may be communicated.

The first network port 105 may include a plurality of subports 110, 115, and at least a portion of these subports 110 may be online or otherwise operational to transmit data. Similarly, in the system 101 of FIG. 1, the second network port 120 may include a plurality of subports 125 that may also be online or otherwise operational to transmit data. The second layer network ports 155 are illustrated in FIG. 1 as a simplified version of the system 101 in that only a first network port 105 and a second network port 120 are shown. The present disclosure, however, contemplates that the network layers 150, 155 described herein may include any number of network ports including any number of respective subports. Additionally or alternatively, the system 101 may include any number of network layers communicably coupled via the intermediate switch 100 or a plurality of intermediate switch devices (e.g., optical switches or the like).

Still further, although illustrated and described herein with reference to the first network port 105 and the second network port 120 located in the same network layer (e.g., second layer network ports 155), the present disclosure contemplates that the network ports 105, 120, may exist in different network layers. For example, the second network port 120 may, in some embodiments, be formed in the first layer network ports 150. In other words, although the resilience operations and techniques of the present disclosure are described herein with reference to a first network port 105 and a second network port 120 within a common network layer 155, these techniques may be applicable to any network configuration in which at least a portion of subports may remain offline, dormant, redundant, etc. to provide resiliency. In some embodiments, the first network port 105 and the second network port 120 may be electrical switches.

With continued reference to FIG. 1, the system 101 may further include the intermediate switch 100 that operates to route communications between the first network port 105 and the second network port 120. In some embodiments, the first network port 105 may be communicably coupled with the second network port 120 via the intermediate switch 100 such that, when operable, communications between the first network port 105 and the second network port 120 are directed via the intermediate switch 100. By way of example, at least a portion of the online subports 110 of the first network port 105 may be communicably coupled with at least a portion of the online subports 125 of the second network port 120. In other embodiments, the first network port 105 and the second network port 120 may be communicably coupled separate from the intermediate switch 100, and the intermediate switch 100 may operate only to redirect communications in the event of a malfunction as described hereinafter. In some embodiments, the intermediate switch 100 may be an optical switch configured to route communication between network ports. While the intermediate switch 100 is shown as a singular intermediate switch in FIG. 1, the present disclosure contemplates that various intermediate switches may be used to communicably couple the first network port 105, the second network port 120, and/or a plurality of other network ports (e.g., first layer network ports 150 or otherwise).

Figure 4:
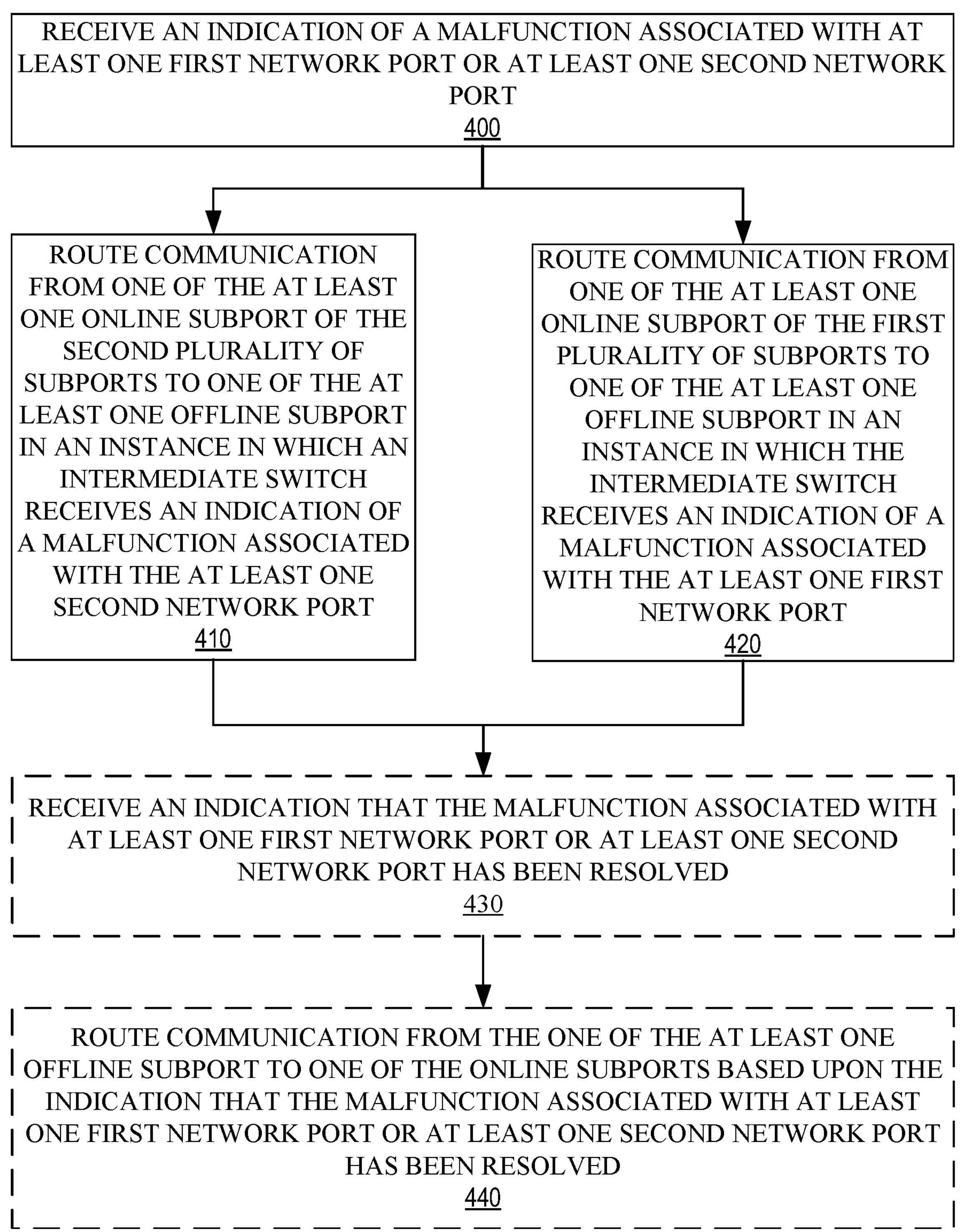
FIG. 4 illustrates a flowchart of an example method for improved network resilience in accordance with various embodiments of the present disclosure.

As described herein, such as with reference to the operations of FIG. 4, the system 101 may include any number of network ports that may be communicably coupled to one another. In the simplified illustration of FIG. 1, the first network port 105 may be in communication with the second network port 120 via the online subports 110 and the online subports 125 of these respective network ports 105, 120 in an instance in which each of these subports 110, 125 are operable. As described above, instances may occur in which either of the network ports malfunction, are subjected to maintenance, or are otherwise offline or inoperable. For example, one or more of the online subports 110 of the first network port 105 may malfunction such that a prior communication link between the online subports 110 of the first network port 105 and the online subports 125 of the second network port 120 is severed, terminated, diminished, etc. For the sake of brevity, the system 101 is illustrated with a single network port (e.g., first network port 105) including redundant or otherwise offline subports 115 (e.g., first offline subports 115) to provide resilience in an instance in which an indication of a malfunction associated with the first plurality of subports (e.g., the online subports 110) occurs. As would be evident to one of ordinary skill in the art in light of the present discourse and as further illustrated in FIG. 2 described hereafter, any of the network ports described herein may include redundant or otherwise offline subports that may operate to provide resilience in the event of subport malfunction.

In order to provide resilience to the system 101 in the event that at least one of the online subports 110 (e.g., any portion of the first plurality of subports that is currently operational) malfunctions (e.g., device failure, maintenance, etc.), the system 101 may include one or more redundant or offline subports (e.g., first offline subport(s) 115). The first offline subports 115 of the first network port 105 may be inoperable, inactive, dormant, or otherwise not communicably coupled with an active/operable network port or subport. In this way, for example, the offline or redundant subport 115 may provide a backup or alternative network subport for any of the other of the first plurality of subports of the first network port 105. For example, if one or more of the online subports 110 malfunctions, the redundant or offline subports 115 may replace the malfunctioning subport of the first network port 105. In some embodiments, the number of redundant or offline subports 115 (e.g., first offline subports 115) may indicate the number of network subports of the first network port 105 that could be offline at a given time without network interruption. In some embodiments, the first redundant or offline subports 115 may be substantially identical to the online subports 110 (e.g., the remainder of the plurality of subports of the first network port 105).

Figure 2:
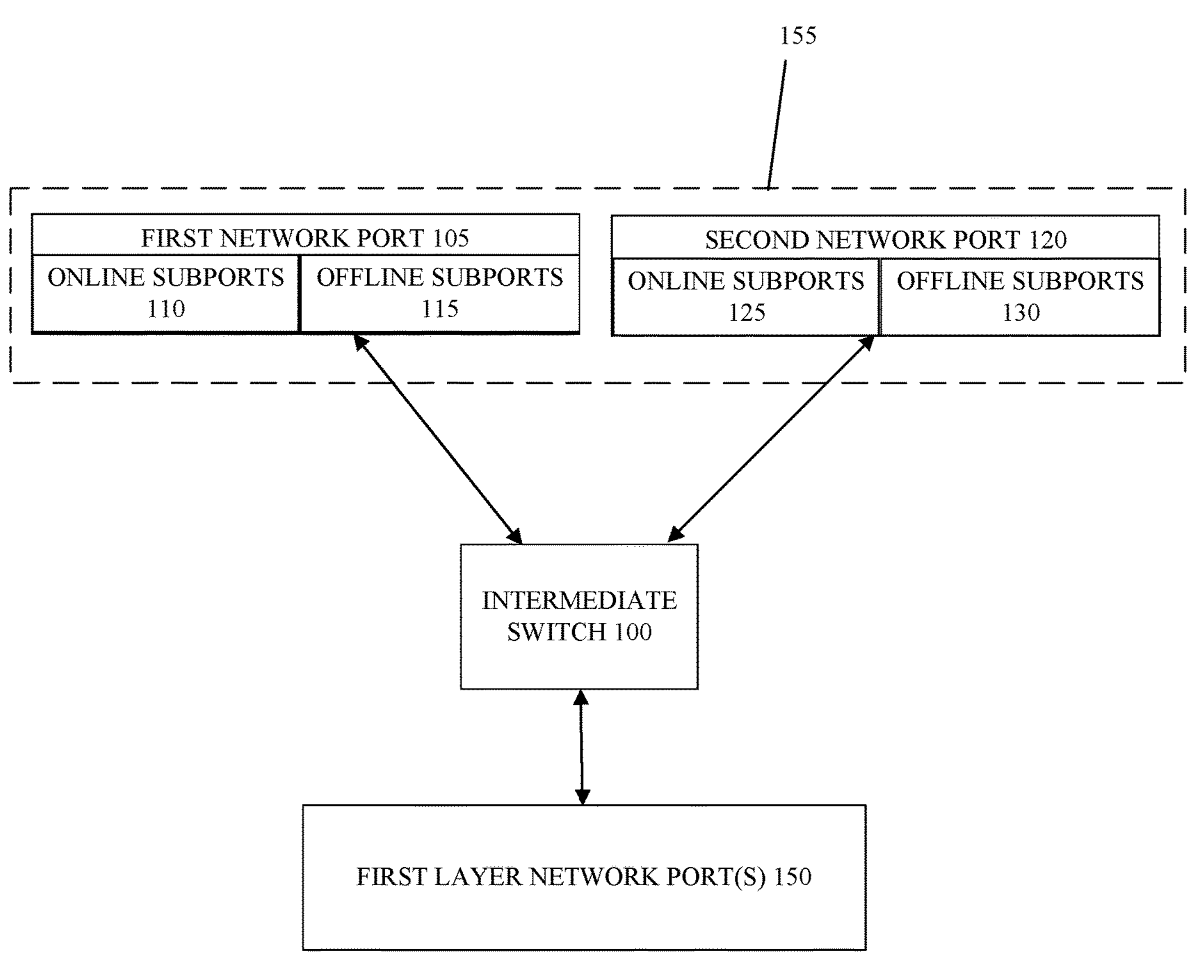
FIG. 2 illustrates another example system for network resilience with multiple redundant/offline subports amongst different network ports in accordance with various embodiments.

With reference to FIG. 2, another example system for network resilience 200 is illustrated with multiple offline subports amongst different network ports. In addition to the components of system 101 in FIG. 1, the plurality of subports of the second network port 120 of system 200 may include at least one second offline subport (e.g., offline subports 130). Similar to the first offline subport(s) 115, the second offline subports 130 may be inoperable, inactive, dormant, or otherwise not communicably coupled with an active/operable network port or subport. In this way, for example, the offline or redundant subport 130 may provide a backup or alternative network subport for any of the other of the second plurality of subports of the second network port 120. For example, if one or more of the online subports 125 malfunctions, the redundant or offline subports 130 may replace the malfunctioning subport of the second network port 120. In some embodiments, the number of redundant or offline subports 130 (e.g., second offline subports 130) may indicate the number of network subports of the second network port 120 that could be offline at a given time without network interruption. In some embodiments, the second redundant or offline subports 130 may be substantially identical to the online subports 125 (e.g., the remainder of the plurality of subports of the second network port 120).

Although illustrated in FIG. 2 with two network ports 105, 120, each of which include respective offline or redundant subports 115, 130, the present disclosure contemplates that the system 200 may include additional network ports that also include offline or redundant subports. In such an embodiment, the offline or redundant subports of the various additional network ports may be used to collectively distribute or communicate the data previously communicated by an online or operational subport. By way of a nonlimiting example, the system 200 may include four (4) network ports, each of which include a plurality of offline or redundant subports. The online subports of, for example, the first network port 105 may include three (3) active or operational subports. In an instance in which these three (3) active or operational subports 110 malfunctions, the system 200 may distribute the communications previously supported by the subports 110 to one or more of the other network ports in the system 200. For example, each of the other three (3) network ports in this example implementation may provide resilience of one (1) of the previously active channels of the first network port 105. The present disclosure contemplates that the embodiments described herein may leverage any number of redundant or otherwise offline subports located on any number of network ports at any number of network layer levels in order to, alone or in combination, provide resilience for potential subport malfunctions.

Example Intermediate Switch

Figure 3:
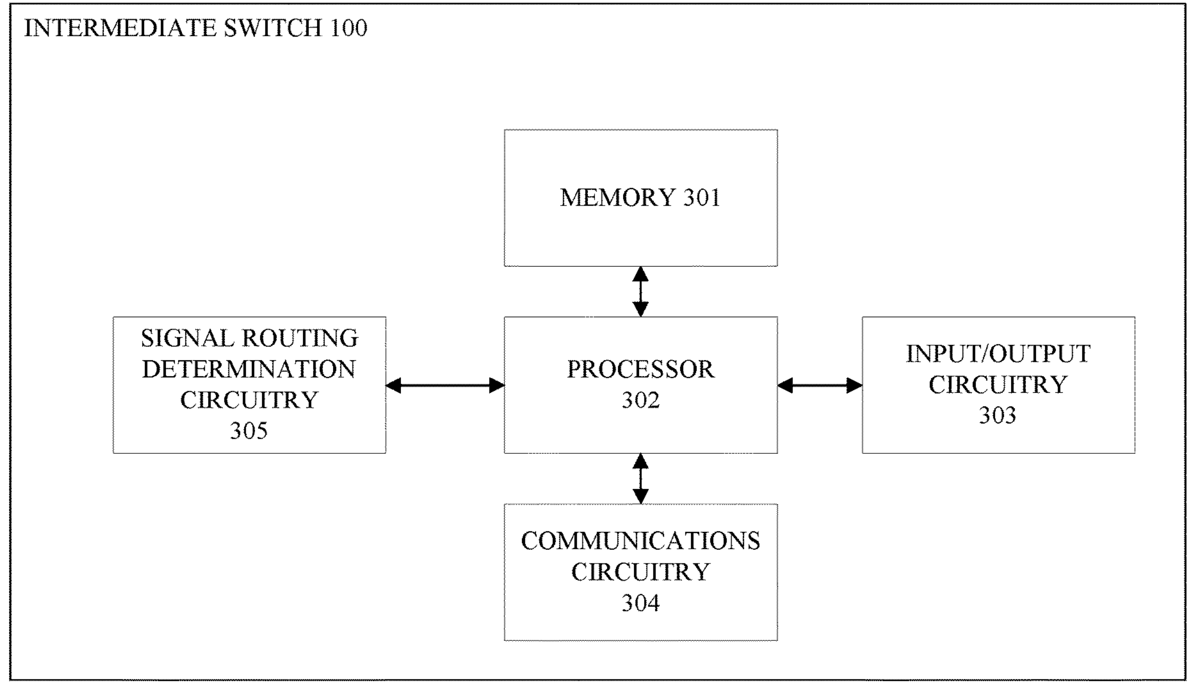
FIG. 3 is an exemplary block diagram of an example intermediate switch, in accordance with various embodiments of the present disclosure.

FIG. 3 illustrates a schematic block diagram of example circuitry, some or all of which may be included in an intermediate switch 100. The components discussed in FIG. 3 may be a part of the intermediate switch 100 or a controller, networking card, computing device, and/or the like that is associated with the intermediate switch 100. In accordance with some example embodiments, the intermediate switch 100 may include a memory 301, processor 302, input/output circuitry 303, and/or communications circuitry 304. Moreover, in some embodiments, signal routing determination circuitry 305 may also or instead be included in the intermediate switch 100. For example, where signal routing determination circuitry 305 is included in the intermediate switch 100, the signal routing determination circuitry 305 may be configured to facilitate the functionality discussed herein regarding establishing and/or terminating communication between various network ports and redundant network ports. An apparatus, such as the intermediate switch 100, may be configured, using one or more of circuitry 301-305, to execute the operations described herein.

Although the term "circuitry" as used herein with respect to components 301-305 is described in some cases using functional language, it should be understood that the particular implementations necessarily include the use of particular hardware configured to perform the functions associated with the respective circuitry as described herein. It should also be understood that certain of these components 301-305 may include similar or common hardware. For example, two sets of circuitries may both leverage use of the same processor, network interface, storage medium, or the like to perform their associated functions, such that duplicate hardware is not required for each set of circuitries. It will be understood in this regard that some of the components described in connection with the intermediate switch 100 may be housed within this device, while other components are housed within other devices (e.g., a controller in communication with the intermediate switch 100).

While the term "circuitry" should be understood broadly to include hardware, in some embodiments, the term "circuitry" also includes software for configuring the hardware. For example, in some embodiments, "circuitry" may include processing circuitry, storage media, network interfaces, input/output devices, and the like. In some embodiments, other elements of the intermediate switch 100 may provide or supplement the functionality of particular circuitry. For example, the processor 302 may provide processing functionality, the memory 301 may provide storage functionality, the communications circuitry 304 may provide network interface functionality, and the like.

In some embodiments, the processor 302 (and/or co-processor or any other processing circuitry assisting or otherwise associated with the processor) may be in communication with the memory 301 via a bus for passing information among components of, for example, intermediate switch 100. The memory 301 may be non-transitory and may include, for example, one or more volatile and/or non-volatile memories, or some combination thereof. In other words, for example, the memory 301 may be an electronic storage device (e.g., a non-transitory computer readable storage medium). The memory 301 may be configured to store information, data, content, applications, instructions, or the like, for enabling an apparatus, e.g., the intermediate switch 100, to carry out various functions in accordance with example embodiments of the present disclosure.

Although illustrated in FIG. 3 as a single memory, the memory 301 may comprise a plurality of memory components. The plurality of memory components may be embodied on a single computing device or distributed across a plurality of computing devices. In various embodiments, the memory 301 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 301 may be configured to store information, data, applications, instructions, or the like for enabling the intermediate switch 100 to carry out various functions in accordance with example embodiments discussed herein. For example, in at least some embodiments, the memory 301 is configured to buffer data for processing by the processor 302. Additionally or alternatively, in at least some embodiments, the memory 301 is configured to store program instructions for execution by the processor 302. The memory 301 may store information in the form of static and/or dynamic information. This stored information may be stored and/or used by the intermediate switch 100 during the course of performing its functionalities.

The processor 302 may be embodied in a number of different ways and may, for example, include one or more processing devices configured to perform independently. Additionally, or alternatively, the processor 302 may include one or more processors configured in tandem via a bus to enable independent execution of instructions, pipelining, and/or multithreading. The processor 302 may, for example, be embodied as various means including one or more microprocessors with accompanying digital signal processor (s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 3 as a single processor, in some embodiments, the processor 302 comprises a plurality of processors. The plurality of processors may be embodied on a single computing device or may be distributed across a plurality of such devices collectively configured to function as the intermediate switch 100. The plurality of processors may be in operative communication with each other and may be collectively configured to perform one or more functionalities of the intermediate switch 100 as described herein.

In an example embodiment, the processor 302 is configured to execute instructions stored in the memory 301 or otherwise accessible to the processor 302. Alternatively, or additionally, the processor 302 may be configured to execute hard-coded functionality. As such, whether configured by hardware or software methods, or by a combination thereof, the processor 302 may represent an entity (e.g., physically embodied in circuitry) capable of performing operations according to an embodiment of the present disclosure while configured accordingly. Alternatively, as another example, when the processor 302 is embodied as an executor of software instructions, the instructions may specifically configure processor 302 to perform one or more algorithms and/or operations described herein when the instructions are executed. For example, these instructions, when executed by processor 302, may cause the intermediate switch 100 to perform one or more of the functionalities of intermediate switch 100 as described herein.

In some embodiments, the intermediate switch 100 further includes input/output circuitry 303 that may, in turn, be in communication with the processor 302 to provide an audible, visual, mechanical, or other output and/or, in some embodiments, to receive an indication of an input from a user or another source. In that sense, the input/output circuitry 303 may include means for performing analog-to-digital and/or digital-to-analog data conversions. The input/output circuitry 303 may include support, for example, for a display, touchscreen, keyboard, mouse, image capturing device (e.g., a camera), microphone, and/or other input/output mechanisms. Input/output circuitry 303 may include a user interface and may include a web user interface, a mobile application, a kiosk, or the like. The input/output device may be used by a user to view and/or adjust malfunction indications (e.g., a user may indicate whether a malfunction has been resolved).

The processor 302 and/or user interface circuitry comprising the processor 302 may be configured to control one or more functions of a display or one or more user interface elements through computer-program instructions (e.g., software and/or firmware) stored on a memory accessible to the processor 302 (e.g., the memory 301, and/or the like). In some embodiments, aspects of input/output circuitry 303 may be reduced as compared to embodiments where the intermediate switch 100 may be implemented as an end-user machine or other type of device designed for complex user interactions. In some embodiments (like other components discussed herein), the input/output circuitry 303 may be eliminated from intermediate switch 100. The input/output circuitry 303 may be in communication with memory 301, communications circuitry 304, and/or any other component(s), such as via a bus. Although more than one input/output circuitry and/or other component can be included in the intermediate switch 100, only one is shown in FIG. 3 to avoid overcomplicating the disclosure (e.g., as with the other components discussed herein).

The communications circuitry 304, in some embodiments, includes any means, such as a device or circuitry embodied in either hardware, software, firmware or a combination of hardware, software, and/or firmware, that is configured to receive and/or transmit data from/to a network and/or any other device, circuitry, or module in communication with the intermediate switch. In this regard, the communications circuitry 304 may include, for example, a network interface for enabling communications with a wired or wireless communication network. For example, in some embodiments, communications circuitry 304 is configured to receive and/or transmit any data that may be stored by the memory 301 using any protocol that may be used for communications between computing devices. For example, the communications circuitry 304 may include one or more network interface cards, antennae, transmitters, receivers, buses, switches, routers, modems, and supporting hardware and/or software, and/or firmware/software, or any other device suitable for enabling communications via a network. Additionally or alternatively, in some embodiments, the communications circuitry 304 includes circuitry for interacting with the antenna(s) to cause transmission of signals via the antenna(e) or to handle receipt of signals received via the antenna(e). These signals may be transmitted by the intermediate switch 100 using any of a number of wireless personal area network (PAN) technologies, such as Bluetooth® v1.0 through v5.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. The communications circuitry 304 may additionally or alternatively be in communication with the memory 301, the input/output circuitry 303, and/or any other component of intermediate switch 100, such as via a bus. The communication circuitry 304 of the intermediate switch 100 may also be configured to receive and transmit information with the various network ports and subports discussed herein.

In some embodiments, the intermediate switch 100 includes hardware, software, firmware, and/or a combination of such components, configured to support various aspects of signal routing in network ports as described herein. It should be appreciated that in some embodiments, the signal routing determination circuitry 305 performs one or more of such exemplary actions in combination with another set of circuitry of the intermediate switch 100, such as one or more of the memory 301, processor 302, input/output circuitry 303, and communications circuitry 304.

For example, in some embodiments, the signal routing determination circuitry 305 utilizes processing circuitry, such as the processor 302 and/or the like, to perform one or more of its corresponding operations. In a further example, and in some embodiments, some or all of the functionality of the signal routing determination circuitry 305 may be performed by processor 302. In this regard, some or all of the example processes and algorithms discussed herein can be performed by at least one processor 302 and/or signal routing determination circuitry 305. It should also be appreciated that, in some embodiments, signal routing determination circuitry 305 may include a separate processor, specially configured field programmable gate array (FPGA), or application specific interface circuit (ASIC) to perform its corresponding functions.

Additionally or alternatively, in some embodiments, the signal routing determination circuitry 305 uses the memory 301 to store collected information. For example, in some implementations, the signal routing determination circuitry 305 includes hardware, software, firmware, and/or a combination thereof, that interacts with the memory 301 to send, retrieve, update, and/or store data.

Accordingly, non-transitory computer readable storage media can be configured to store firmware, one or more application programs, and/or other software, which include instructions and/or other computer-readable program code portions that can be executed to direct operation of the intermediate switch 100 to implement various operations, including the examples shown herein. As such, a series of computer-readable program code portions may be embodied in one or more computer-program products and can be used, with a device, intermediate switch 100, database, and/or other programmable apparatus, to produce the machine-implemented processes discussed herein. It is also noted that all or some of the information discussed herein can be based on data that is received, generated and/or maintained by one or more components of the intermediate switch 100. In some embodiments, one or more external systems (such as a remote cloud computing and/or data storage system) may also be leveraged to provide at least some of the functionality discussed herein.

Example Method for Providing Resilience in Network Communications

FIG. 4 illustrates an example method for providing improved resilience in network communications (e.g., method 400). The method may be carried out by embodiments of the system discussed herein (e.g., the intermediate switch 100 and/or related controllers). An example system may include at least one non-transitory storage device and at least one processing device coupled to the at least one non-transitory storage device, as described above. In such an embodiment, the at least one processing device is configured to carry out the method discussed herein. While the operations of FIG. 4 are described hereinafter with reference to the first network port 105 and the second network port 120 of FIGS. 1-2, these operations may be equally applicable to any combination of network ports and subports without limitation.

Referring now to Block 402 of FIG. 4, the method 400 may include receiving an indication of a malfunction associated with a first plurality of subports of a first network port. As described above, an example first network port and an example second network port may each communicably connected to the intermediate switch, such that at least a portion of a plurality of subports of the first network port are communicably coupled with at least a portion of the plurality of subports of the second network port. For example, the first network port may include one or more online subports and the second network port may include one or more online subports. Each of the online subports may be communicably connected to the intermediate switch 100 in an instance in which the given online subports are operable. The indication of the malfunction of operation 402 may be associated with a specific subport of the first network port 105 and may be, for example, provided via a transmission (e.g., a message) from the malfunctioning subport. Additionally or alternatively, the malfunction may be actively detected by the intermediate switch (e.g., the indication of a malfunction may be a change in the volume, speed, and/or any characteristic of the data received (or lack thereof) by the intermediate switch from the malfunctioning network port and/or subport).

The indication of malfunction may be received in an instance in which the particular network port or subport is currently offline or is required to be offline. For example, the indication of malfunction may indicate that at least one subport of the first network is malfunctioning, requires maintenance, and/or any other reason(s) that the network port is going to (or currently is) offline, inoperable, inactive, etc. In some instances, the indication of malfunction may be received before the associated network port or subport is offline to allow for the intermediate switch to use a redundant/offline network port to prevent any outages in the network. For example, if a network port is in the process of failing or requires imminent maintenance, the intermediate switch may receive the indication of malfunction while the network port or subport is online to allow for an efficient transfer. Additionally or alternatively, the indication of malfunction may be received after the associated network port or subport is offline, inactive, or inoperable, and, therefore, such that operations by the intermediate switch may be responsive as opposed to proactive. In an instance in which the portion (e.g., online subports) of the first network port and the second network port are operable, the redundant/offline subports of at least the first network port may remain offline, dormant, or otherwise inoperable.

Referring now to Block 404 of FIG. 4, the method may include routing communication from the second plurality of subports to the at least one first offline subport of the first network port in an instance in which an intermediate switch receives an indication of a malfunction associated with the first plurality of subports. In various embodiments, in an instance in which the at least one subport of the first network port is malfunctioning, the communication between the malfunctioning subport of the first network port and a corresponding subport of the second network port may be terminated. The corresponding subport of the second network port may be communicably coupled, via the intermediate switch, with the first offline subport (e.g., a redundant subport) of the first network port. In doing so, the subports of the second network port remain operational.

Referring now to optional Block 406 of FIG. 4, the method may include receiving an indication that the malfunction associated with the first plurality of subports has been resolved. The malfunction may be resolved in various ways, such as determining the indication of malfunction was unnecessary, repairing any malfunctions, preforming any maintenance on the network port, and/or the like. The indication that the malfunction is resolved may be automated or received from a user. For example, the indication that the malfunction associated with the subport(s) of the first network port has been resolved may be received from a user. In particular, the system may include a user interface that allows the user to indicate that the malfunction has been resolved. In some instances, the system may receive the indication from a user that the malfunction is resolved, and the system may perform one or more automated communications with the given subport to confirm that the network port and subport are operational. In some embodiments, the connection between the subport associated with the malfunction indication and the intermediate switch may be restored, such that the intermediate switch may automatically that the given network port and subport are operational.

Referring now to optional Block 408 of FIG. 4, the method may include reestablishing communication between the second plurality of subports and the first plurality of subports other than the first offline subport. Similar to operation 404, the intermediate switch may be configured to terminate and reestablish communication between various network ports and subports. As such, once the intermediate switch determines that the malfunction that was previously associated with at least one subport of the first network port is resolved, the intermediate switch may route the communication(s) that had previously been routed to the first offline subport(s) back to the online subports (e.g., the first plurality of subports). Thereafter, the first redundant/offline subport may return to a dormant, offline, or deactivated state.

Although the operations of FIG. 4 are described herein with reference to routing of communications in response to a potential malfunction of the subport(s) of the first network port, the present disclosure contemplates that similar operations may occur for any other network port leveraged by the systems of the present disclosure. For example, the operations of FIG. 4 may be equally applicable to the system of FIG. 2 (e.g., system 200) in which each network port in the system includes at least one respective offline subport configured to provide resilience in the event of a potential subport malfunction. Furthermore, the operations of FIG. 4 may be applied to embodiments, as described above, in which communications that were previously associated with a malfunctioning network port (e.g., a plurality of malfunctioning subports) may be distributed amongst a plurality of offline or redundant ports supported or otherwise defined by a corresponding plurality of network ports.

Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for providing resilience in network communications, the system comprising:

at least one first network port comprising a first plurality of subports located at a second network layer, wherein at least one of the first plurality of subports comprises at least one first offline subport, wherein the at least one first offline subport is inoperable in an instance in which each of the remaining first plurality of subports are operable;

at least one second network port comprising a second plurality of subport located at the second network layer;

a first layer network port located at a first network layer different from the second network layer; and an intermediate switch disposed between the first network layer and the second network layer and communicably connected to the at least one first network port, the at least one second network port, and the first layer network port, wherein the intermediate switch comprises an optical switch configured to:

selectively route communication between the first layer network port and the first plurality of subports of the at least one first network port and the second plurality of subports of the at least one second network port; and selectively route communication from one of the second plurality of subports to the at least one first offline subport in an instance in which the optical switch receives an indication of a malfunction associated with the first plurality of subports.

2. The system of claim 1, wherein, in response to the indication of the malfunction associated with the first plurality of subports, the optical switch of the intermediate switch is configured to terminate communication to at least one of the first plurality of subports associated with the indication of the malfunction.

3. The system of claim 1, wherein, in response to an indication that the malfunction associated with the first plurality of subports has been resolved, the optical switch of the intermediate switch is further configured to reestablish communication between the second plurality of subports and the first plurality of subports other than the first offline subport.

4. The system of claim 1, wherein at least one of the second plurality of subports comprises at least one second offline subport that is inoperable in an instance in which each of the second plurality of subports are operable.

5. The system of claim 4, wherein the optical switch of the intermediate switch is configured to route communication from one of the first plurality of subports to the at least one second offline subport in an instance in which the optical switch intermediate switch receives an indication of a malfunction associated with the second plurality of subports.

6. The system of claim 4, wherein the optical switch of the intermediate switch is configured to route communication from the first layer network port to the at least one second offline subport in an instance in which the optical switch intermediate switch receives an indication of a malfunction associated with the second plurality of subports.

7. The system of claim 1, wherein the at least one first network port and the at least one second network port are electrical network ports.

8. The system of claim 1, wherein the optical switch of the intermediate switch is further configured to selectively route communication from the first layer network port to the at least one first offline subport in an instance in which the optical switch receives an indication of a malfunction associated with the first plurality of subports.

9. An optical switch for providing resilience in network communications, the optical switch communicably connected to at least:

one first network port comprising a first plurality of subports located at a second network layer;

at least one second network port comprising a second plurality of subports located at the second network layer; and a first layer network port located at a first network layer different from the second network layer, wherein at least one of the first plurality of subports comprises at least one first offline subport, wherein the at least one first offline subport is inoperable in an instance in which each of the remaining first plurality of subports are operable, and wherein the optical switch is configured to:

selectively route communication between the first layer network port and the first plurality of subports of the at least one first network port and the second plurality of subports of the at least one second network port; and selectively route communication from one of the second plurality of subports to the at least one first offline subport in an instance in which the intermediate switch receives an indication of a malfunction associated with the first plurality of subports.

10. The optical switch of claim 9, further configured to, in response to the indication of the malfunction associated with the first plurality of subports, terminate communication to at least one of the first plurality of subports associated with the indication of the malfunction.

11. The optical switch of claim 9, further configured to, in response to an indication that the malfunction associated with the first plurality of subports has been resolved, reestablish communication between the second plurality of subports and the first plurality of subports other than the first offline subport.

12. The optical switch of claim 9, wherein at least one of the second plurality of subports comprises at least one second offline subport that is inoperable in an instance in which each of the second plurality of subports are operable.

13. The optical switch of claim 12, further configured to route communication from one of the first plurality of subports to the at least one second offline subport in an instance in which the optical switch receives an indication of a malfunction associated with the second plurality of subports.

14. The optical switch of claim 9, wherein the at least one first network port and the at least one second network port are electrical network ports.

15. The optical switch of claim 9, further configured to selectively route communication from the first layer network port to the at least one first offline subport in an instance in which the optical switch receives an indication of a malfunction associated with the first plurality of subports.

16. A method for providing resilience in network communications, the method comprising:

communicably connecting, by an optical switch, at least:

one first network port comprising a first plurality of subports located at a second network layer wherein at least one of the first plurality of subports comprises at least one first offline subport, wherein the at least one first offline subport is inoperable in an instance in which each of the remaining first plurality of subports are operable;

at least one second network port comprising a second plurality of subports located at the second network layer; and a first layer network port located at a first network layer different from the second network layer receiving, by the optical switch, an indication of a malfunction associated with a first plurality of subports of a first network port; and routing communication, via the optical switch, from one of the second plurality of subports to the at least one first offline subport.

17. The method of claim 16, further comprising, in response to the indication of the malfunction associated with the first plurality of subports, terminating, by the optical switch, communication to at least one of the first plurality of subports associated with the indication of the malfunction.

18. The method of claim 16, further comprising, in response to an indication that the malfunction associated with the first plurality of subports has been resolved, reestablishing, by the optical switch, communication between the second plurality of subports and the first plurality of subports other than the first offline subport.

19. The method of claim 16, wherein at least one of the second plurality of subports comprises at least one second offline subport that is inoperable in an instance in which each of the second plurality of subports are operable.

20. The method of claim 19, further comprising, in an instance in which the optical switch receives an indication of a malfunction associated with the second plurality of subports, routing communication from one of the first plurality of subports to the at least one second offline subport.

* * * * *